United States Patent
Appanna et al.

(10) Patent No.: US 7,565,694 B2
(45) Date of Patent: Jul. 21, 2009

(54) METHOD AND APPARATUS FOR PREVENTING NETWORK RESET ATTACKS

(75) Inventors: Chandrashekhar Appanna, Cupertino, CA (US); Anantha Ramaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 706 days.

(21) Appl. No.: 10/959,225

(22) Filed: Oct. 5, 2004

(65) Prior Publication Data

US 2006/0075482 A1   Apr. 6, 2006

(51) Int. Cl.
G06F 11/00 (2006.01)
G06F 12/16 (2006.01)
G06F 15/18 (2006.01)
G08B 23/00 (2006.01)

(52) U.S. Cl. .................................... 726/24
(58) Field of Classification Search .............. 726/24
See application file for complete search history.

(56) References Cited

U.S. PATENT DOCUMENTS

| 6,751,668 | B1 * | 6/2004 | Lin et al. ............... 709/227 |
| 6,779,033 | B1 | 8/2004 | Watson et al. |
| 7,013,482 | B1 | 3/2006 | Krumel et al. |
| 7,069,438 | B2 | 6/2006 | Balabine et al. |
| 7,076,555 | B1 | 7/2006 | Orman et al. |
| 7,275,093 | B1 | 9/2007 | Freed et al. |
| 2002/0101819 | A1 | 8/2002 | Goldstone |
| 2002/0145976 | A1 | 10/2002 | Meyer et al. |
| 2003/0140124 | A1 | 7/2003 | Burns |
| 2003/0154399 | A1 | 8/2003 | Zuk et al. |
| 2003/0191844 | A1 | 10/2003 | Meyer et al. |
| 2004/0006643 | A1 | 1/2004 | Dolson et al. |
| 2004/0052234 | A1 | 3/2004 | Ameigeiras et al. |
| 2005/0021999 | A1 | 1/2005 | Touitou et al. |
| 2006/0253603 | A1 | 11/2006 | Clark et al. |

OTHER PUBLICATIONS

R. Stewart, Transmission Control Protocol security considerations draft-ietf-tcpm-tcpsecure-00, Apr. 19, 2004, IETF.*

AppleShare IP 6.3.3: How to Turn TCP Filtering On and Off, Dec. 13, 2003, Apple.*

(Continued)

*Primary Examiner*—Kambiz Zand
*Assistant Examiner*—James Turchen
(74) *Attorney, Agent, or Firm*—Hickman Palermo Truong & Becker LLP

(57) ABSTRACT

A method for improving resistance of network protocols running on transmission control protocol (TCP), such as BGP. For example, a method comprises receiving, from a TCP application, a request to ignore all TCP segments with an RST bit set, except for solicited RST segments; establishing a filter that blocks all but solicited TCP RST segments; receiving a TCP segment with a SYN bit set and a sequence number value within an allowed window for a TCP connection matching the received segment, and for a session of the TCP application; re-configuring the filter to allow TCP RST segments for the connection associated with the received segment; requesting the TCP application to initiate an event that will induce a legitimate sender of the received segment to send a valid TCP RST segment in response; and closing the connection only when a TCP RST segment is received in response.

20 Claims, 6 Drawing Sheets

OTHER PUBLICATIONS

TCP Common Applications and Server Port Assignments, The TCP/IP Guide.*
Bellovin, S., "Defending Against Sequence Number Attacks" May 1996, Network Working Group, Request for Comments: 1948 (6 pages).
Stewart, R. "Transmission Control Protocol Security Considerations," Network Working Group Internet Draft, Apr. 19, 2004, 11 pages.
International Searching Authority, "Notification of Transmittal of the International Search Report and the Written Opinion of the International Searching Authority, or the Declarations," PCT/US05/00551, dated May 26, 2006, 7 pages.
Current Claims, PCT/US05/00551, 4 pages.
Dalal, M., "Transmission Control Protocol Security Considerations," Network Working Group, internet draft, Jun. 2, 2004, 85 pages.
Fenner, B., et al., "Multicast Source Discovery Protocol (MSDP)," Network Working Group, RFC 3618, Oct. 2003, 19 pages.
The Patent Office of the People's Republic of China, "The Third Office Action", Application No. 200580001378.2, dated Oct. 31, 2008, 6 pages.
Claims, Application No. 200580001378.2, 4 pages.

* cited by examiner

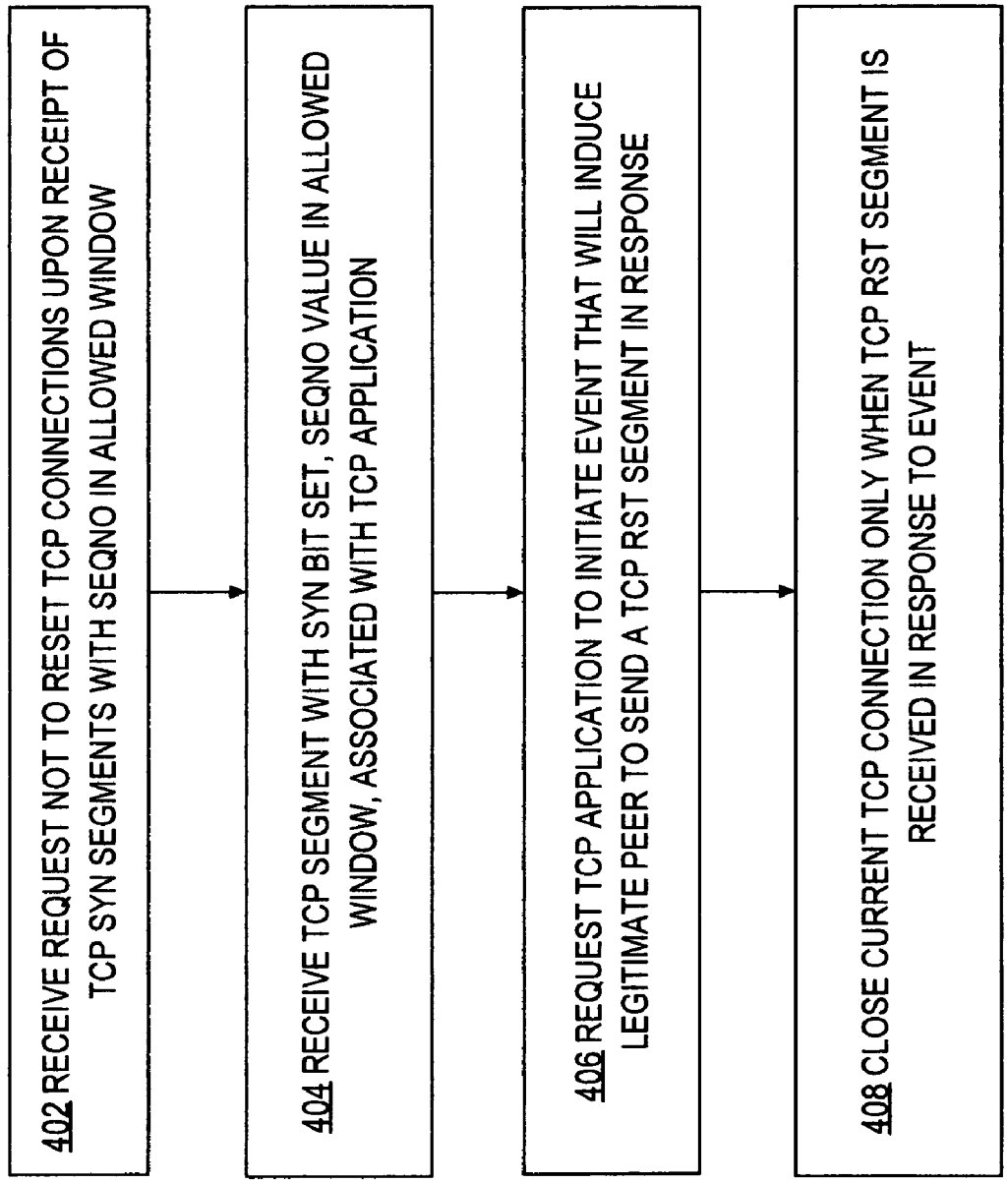

METHOD AND APPARATUS FOR PREVENTING NETWORK RESET ATTACKS

CROSS-REFERENCE TO RELATED APPLICATIONS

The subject matter of this application is related to Ser. No. 10/755,146, filed Jan. 9, 2004, "Preventing Network Reset Denial of Service Attacks," of Mitesh Dalal et al., and to Ser. No. 10/842,015, filed May 6, 2004, "Preventing Network Reset Denial of Service Attacks Using Embedded Authentication Information," of Anantha Ramaiah et al.

FIELD OF THE INVENTION

The present invention generally relates to network transport-layer communication protocols. The invention relates more specifically to techniques for preventing malicious connection reset attacks on network elements that exploit the operation of Transmission Control Protocol (TCP) and applications that use it.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks have become an important tool for businesses and consumers alike, many of which are now dependent on the constant availability of network resources such as mail servers, Web sites, and content servers. As use of networks increases, protecting networks from disruption by malicious entities through denial of service ("DoS") attacks becomes more critical. DoS attacks deprive legitimate users of access to network services, and have been used successfully to disrupt legitimate user access to internet sites such as Yahoo! and CNN.

One type of DoS attack takes advantage of the basic design of the Transmission Control Protocol ("TCP"), one of the foundational protocols of the Internet, as defined in Internet Engineering Task Force (IETF) Request for Comments (RFC) 793. This type of DoS attack, known as a TCP Reset or RST attack, exploits the fact that under an implementation of TCP that is compliant with RFC 793 a TCP connection can be properly terminated in response to receiving a TCP packet from a remote node in which the Reset bit ("RST bit") in the header is set.

A TCP Reset attack seeks to shut down legitimate TCP sessions by injecting, into an active TCP connection, a spoofed segment with the Reset (RST) flag set and containing a packet sequence value that falls within a range of valid sequence values as allowed by the receiving node. Typically an attacker first determines or guesses the IP addresses of both endpoints and the port numbers that the endpoints are using for a TCP connection or higher-level protocol. A successful attacker also guesses a sequence number that falls within the allowed range or window. Sending any TCP segment with the RST flag set, correct IP addresses and port numbers with the sequence number falling within the window of the TCP connection can cause a receiving node that implements TCP properly under RFC 793 to shut down the TCP connection.

A TCP SYN attack proceeds in a similar manner. If an attacker sends a TCP packet with the SYN bit set in the header, and a sequence value that falls within a window of allowed sequence values, under RFC 793 the receiving node closes the TCP connection and sends a TCP RST packet. RFC 793 provided this process in order to enable non-synchronized hosts to close a connection and re-synchronize, but in contemporary practice the process creates a security vulnerability.

Border Gateway Protocol (BGP), Label Distribution Protocol (LDP), Multicast Source Discovery Protocol (MSDP), Hypertext Transfer Protocol (HTTP), some voice protocols, Multi-Protocol Label Switching (MPLS), and other protocols use TCP connections and are targets for these attacks. The consequences can be severe. For example, when a BGP session of a router is disrupted by closing the associated TCP connection, the router will discard all BGP routes that it has created, essentially causing a failure of the BGP process. As a result, the BGP process must re-synchronize itself with peer routers in the network, and during the re-synchronization period the failed router cannot forward any traffic. Accordingly, researchers in this field are interested in creating ways to thwart TCP Reset attacks, without fundamentally altering the operation of TCP as specified in RFC 793.

In one approach, researchers have thought that by assigning a pseudo-random 32-bit value as the Initial Sequence Number (ISN) for a new TCP connection, an attacker could not guess the correct sequence number in any practical way, because the number of potentially correct values is 232 or approximately 4 billion values, making such an attack virtually impossible. This principle may be true in the case of an attacker who attempts to inject a data segment into an existing TCP connection.

However, a conventional TCP implementation compliant with RFC 793 will accept a RST segment or SYN packet if the sequence number of the segment falls within a window or range of acceptable values, even if the sequence number is not an exact match to the next expected sequence number. This approach is used to compensate for the possibility that packets may be lost. In some implementations of TCP the range of allowed sequence values may be as large as 16,000 to more than 50,000 values. Unfortunately, a consequence is that the attacker does not need to generate all 32 bits of the sequence number correctly to provide a number that a receiving node will accept, even when a truly random or pseudorandom ISN is used. If the range of allowed sequence values is sufficiently large, then the chance is greatly increased that an attacker can guess a correct sequence value through either random or brute-force selection in a practical amount of time. The larger the window established by the receiving node, the easier it is for the hacker to carry out this attack.

Thus, a TCP implementation that merely checks a newly arrived RST packet or SYN packet for an established connection to determine whether the sequence number is within a given window, and tears down the connection if so, is inadequate to prevent attack by a hacker seeking to terminate a connection prematurely.

Another approach, as used in the OpenBSD implementation of TCP under UNIX, guards against a Reset attack by requiring that the Reset packet carry a sequence number that is exactly the next expected sequence number, and not just within the expected window. If a Reset packet carries a sequence number that is not an exact match, the TCP process ignores the Reset packet and does nothing. However, this approach is considered impractical, because for a receiver more often than not the sequence number of a TCP packet is not the same as the next expected due to loss of packets. When lost packets occur in the OpenBSD approach, the receiving node is left with a connection that the sending node considers closed.

In still another approach, TCP RST "damping" is performed in which a node ignores RST packets if too many such packets arrive within a given time period. However, this approach is inadequate because even one improper RST packet may be sufficient to induce closure of a critical TCP connection.

An approach for addressing a similar attack, known as the SYN-RST attack, is provided in co-pending application Ser. No. 10/641,494, filed Aug. 14, 2003, entitled "Detecting network denial of service attacks," of Pritam Shah et al., and assigned to the same assignee hereof. The approach of Shah et al. is appropriate for an intermediate router rather than a TCP endpoint device, but does not fully address all issues described in this disclosure.

Another approach is described in co-pending application Ser. No. 10/755,146, filed Jan. 9, 2004, entitled "Preventing Network Reset Denial of Service Attacks," of Mitesh Dalal et al., and assigned to the same assignee hereof. The approach of Dalal et al. incurs one additional round-trip packet exchange to implement a challenge and response, and also injects additional segments into the network, increasing the use of valuable bandwidth. Although the approach of Dalal et al. is highly useful, an attacker can succeed by guessing correct values for the 4-tuple of values that identifies the TCP endpoints, and a 32-bit sequence number matching the "rcvnxt" value maintained in the Transmission Control Block (TCB). Thus, a solution having additional robustness against attack would be useful to have.

Researchers at Cisco Systems, Inc. have proposed certain ways to address malicious BGP session resets at the TCP level, in the IETF internet-draft document entitled "draft-ietf-tcpm-tcpsecure-01.txt." While the approach of this draft is beneficial, additional improvements could be made. For example, TCP cannot originate data on behalf of an application for retransmission until an acknowledgment is received from a peer network element. Further, a TCP-based solution needs to be deployed in all network elements before it becomes effective, and there is no test to ensure that all routers are using the solution. Therefore, a BGP process cannot rely solely on TCP to prevent attacks that cause a BGP connection reset.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram of yet another embodiment of a method for preventing network reset attacks.

DETAILED DESCRIPTION

Figure 1:
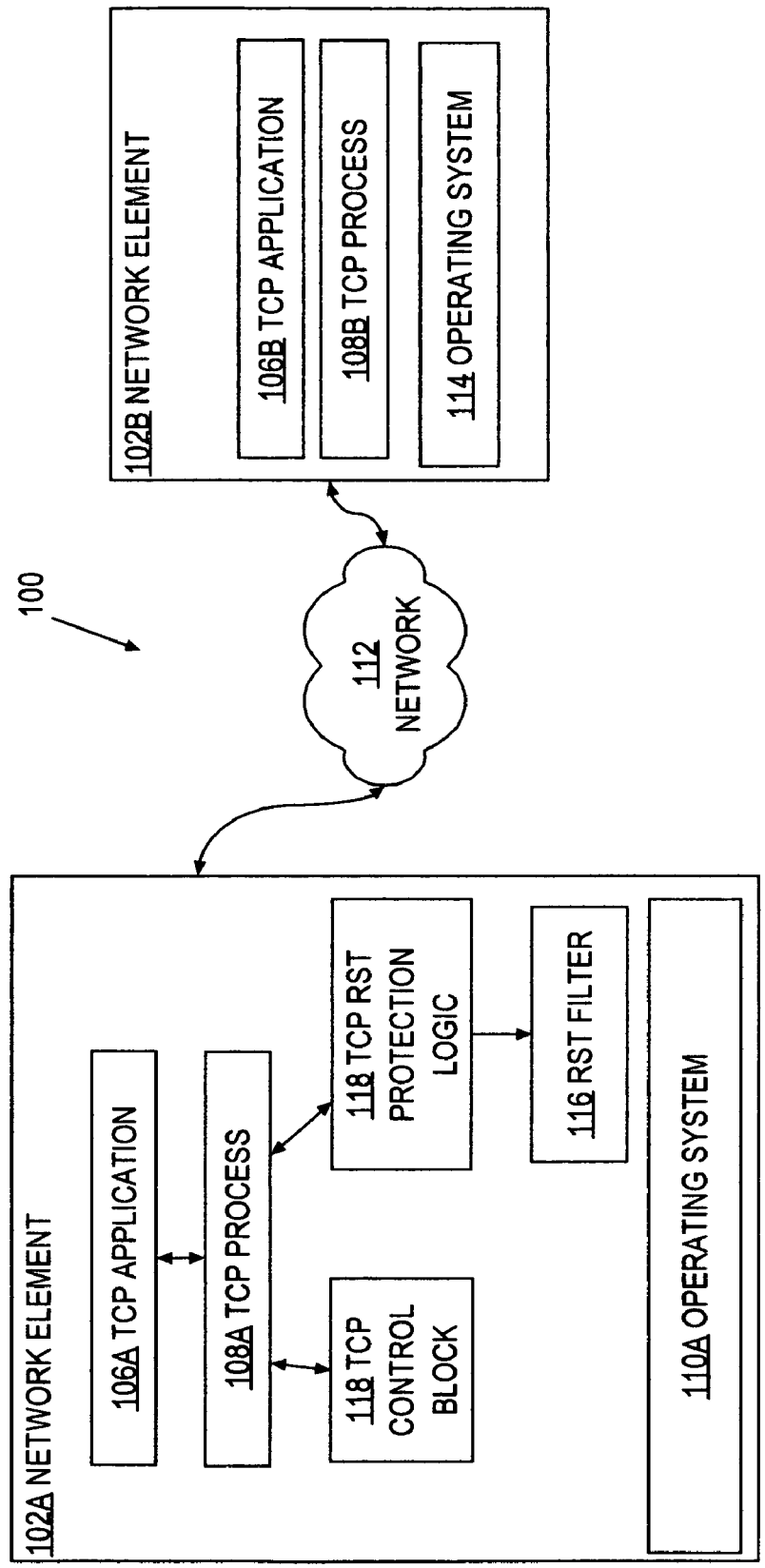
FIG. 1 is a block diagram that illustrates an example network arrangement in which an embodiment may be used.

A method and apparatus for preventing network reset attacks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms-Hardware Overview
4.0 Extensions and Alternatives 1.0 General Overview The needs identified in the foregoing Background, and other needs and objects that will become apparent for the following description, are achieved in the present invention, which comprises, in one aspect, a method performed by a transmission control protocol (TCP) process in a network element, comprising the computer-implemented steps of receiving, from a TCP application, a request to ignore all TCP segments with an RST bit set, except for solicited RST segments; establishing a TCP filter that blocks all but solicited TCP RST segments; receiving a TCP segment with a SYN bit set and a sequence number value within an allowed window for a TCP connection matching the received TCP segment, wherein the received TCP segment is associated with a session of the TCP application; re-configuring the TCP filter to allow TCP RST segments for the TCP connection associated with the received TCP segment; requesting the TCP application to initiate an event that will induce a legitimate sender of the received TCP segment to send a valid TCP RST segment in response; and closing the TCP connection associated with the received TCP segment only when a TCP RST segment is received in response to the event.

In another aspect, the invention provides a method performed by a transmission control protocol (TCP) process in a network element, comprising the computer-implemented steps of receiving, from a TCP application, a request to ignore all TCP segments with an RST bit set, except for solicited RST segments; setting a flag value in a TCP connection state data structure, wherein the flag value signals silently dropping all but solicited TCP RST segments; receiving a TCP segment with a SYN bit set and a sequence number value within an allowed window for a TCP connection matching the received TCP segment, wherein the received TCP segment is associated with a session of the TCP application; re-setting the flag value to allow TCP RST segments for the TCP connection associated with the received TCP segment; requesting the TCP application to initiate an event that will induce a legitimate sender of the received TCP segment to send a valid TCP RST segment in response; closing the TCP connection associated with the received TCP segment only when a TCP RST segment is received in response to the event.

In other aspects, the invention encompasses a computer apparatus and a computer-readable medium configured to carry out the foregoing steps.

2.0 Structural and Functional Overview

FIG. 1 is a block diagram that illustrates an example network arrangement in which an embodiment may be used. In network arrangement 100 at least a first network element 102A is communicatively coupled through a network 112 to a second network element 102B. For purposes of illustrating a clear example, in FIG. 1 two network elements 102A, 102B are shown, but in other embodiments network arrangement 100 may include any number of network elements.

Network elements 102A, 102B communicate using a transport-layer protocol based on data segments such as transmission control protocol (TCP) as defined in IETF RFC793. Typically, but not necessarily, network elements 102A, 102B are routers or switches and network 112 is a packet-switched network. However, the techniques herein are applicable to any other network elements, such as personal computers, workstations, servers, printers, etc., which implement TCP for transport-layer connectivity.

The first network element 102A comprises an operating system 110A, TCP process 108A, and TCP application 106A. Operating system 110 controls and supervises operations of hardware elements of network element 102A and other applications and processes. TCP process 108A runs logically on top of operating system 110 and implements the TCP protocol. TCP process 108A may be implemented as part of a protocol stack or using one or more other software elements. The TCP application 106A is any other application or protocol that uses TCP connections, which are established by TCP process 108A, for communications or messaging. For example, TCP application 106A may be a BGP process, label distribution protocol (LDP) process, multicast source distribution protocol (MSDP) process, or any other process that uses TCP connections.

The second network element 102B hosts a corresponding TCP application 106B and TCP process 108B, which run under the supervision and control of a second operating system 114. In this arrangement, TCP processes 108A, 108B are TCP peers and establish one or more TCP connections among themselves as provided in RFC 793. TCP applications 106A, 106B also act as peers and communicate with one another using the TCP connections.

First network element 102A creates one or more TCP control blocks 120 for storing and managing metadata relating to TCP connections between the first network element and the second network element 102B. First network element 102A further hosts TCP RST protection logic 118 and one or more RST filters 116. The logic 118 and filters 116 may be integrated into TCP process 108A. Logic 118 comprises one or more computer program instructions or other software elements that implement the methods described herein with respect to FIG. 2, FIG. 3A. FIG. 3B. Filters 116 are established by logic 118 under certain conditions that are described herein. Filters 116 act to block certain instances of TCP segments that have the RST (reset) bit set so that such segments cannot be processed by TCP process 108A or cause connection resets.

Figure 2:
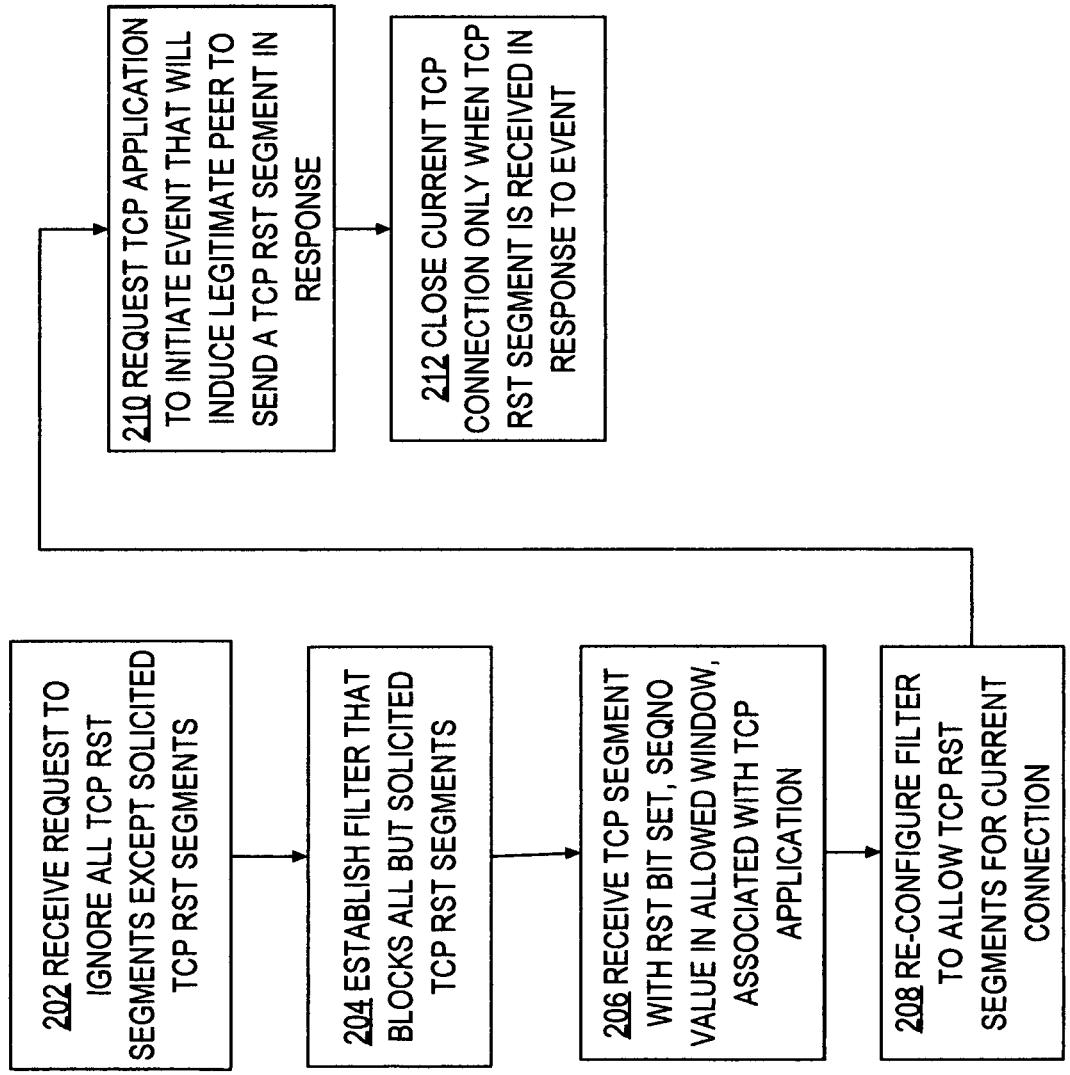
FIG. 2 is a flow diagram that illustrates a high level overview of one embodiment of a method for preventing network reset attacks.

FIG. 2 is a flow diagram that illustrates a high level overview of one embodiment of a method for preventing network reset attacks. For purposes of illustrating a clear example, FIG. 2 is described herein with reference to the elements of FIG. 1. However, the techniques described herein may be used with many other network arrangements, and the techniques are not limited to the particular arrangement of FIG. 1.

The process of FIG. 2 assumes that TCP process 108A has established a TCP connection to TCP process 108B for use by TCP application 106A, 106B using the steps described in RFC 793 and related RFCs, and that the connection is in the ESTABLISHED state as defined in the RFCs. Further, FIG. 2 assumes that metadata relating to the TCP connection are stored in TCP control block 120. For purposes of illustrating a clear example, the description herein assumes that TCP application 106A only establishes one TCP connection to TCP application 106B. However, in a practical embodiment, any number of applications may establish any number of concurrent or consecutive connections.

In step 202, a request is received from a TCP application to ignore all segments with an RST bit set, except for solicited RST segments. For example, TCP application 106A calls a function of TCP process 108A, provided through a suitable application programming interface (API) of the TCP process, which creates a TCP RST Filtering connection property in TCP control block 120. Setting the TCP RST Filtering connection property in a TCP control block automatically causes the TCP process 108A to invoke TCP RST protection logic 118 with respect to the TCP connection associated with the property in the control block. In this example, step 204 through step 212 of FIG. 2 are implemented by TCP RST protection logic 118.

In step 204, a TCP filter that blocks all but solicited TCP RST segments is established. For example, TCP RST protection logic 118 creates RST filter 116 for the connection. In this context, a "solicited TCP RST segment" is a legitimate TCP RST segment that second network element 102B sends to the first network element 102A in response to any event initiated by the first network element that induces the second network element to send a valid segment.

In step 206, a TCP segment with the RST bit set, and a sequence number value within an allowed window of sequence numbers for the connection, is received. The TCP segment is associated with a session of a TCP application that is using the connection. For example, the segment contains header values that identify it as a BGP TCP segment. However, the segment could be a spurious or malicious segment that a malicious party has sent for the purpose of resetting the connection, after successfully guessing metadata values for the connection such as the source and destination IP addresses, source and destination port values, and sequence number window. Therefore, attack prevention steps are performed.

In step 208, the TCP filter is re-configured to allow entry of RST segments for the current connection. For example, TCP process 108A re-configures RST filter 116 so that future TCP RST segments received from TCP process 108A can reach TCP RST protection logic 118.

In step 210, the TCP application is requested to initiate an event that will induce a legitimate sender of the received TCP segment to send a valid TCP RST segment in response. The process of FIG. 2 assumes that TCP application 106A then initiates such an event. Examples of events are described further herein. In step 212, the TCP connection is closed only when a TCP RST segment is received in response to the event. For example, if TCP process 108B sends a segment with the ACK (acknowledge) bit set in response to the event, TCP RST protection logic 118 does not close the connection. As a result, spurious RST segments received at step 206 are suppressed and do not cause connection resets. Such RST segments can actually cause a connection reset only when another confirming RST segment is received in response to the event that is requested at step 210.

Figure 3A:
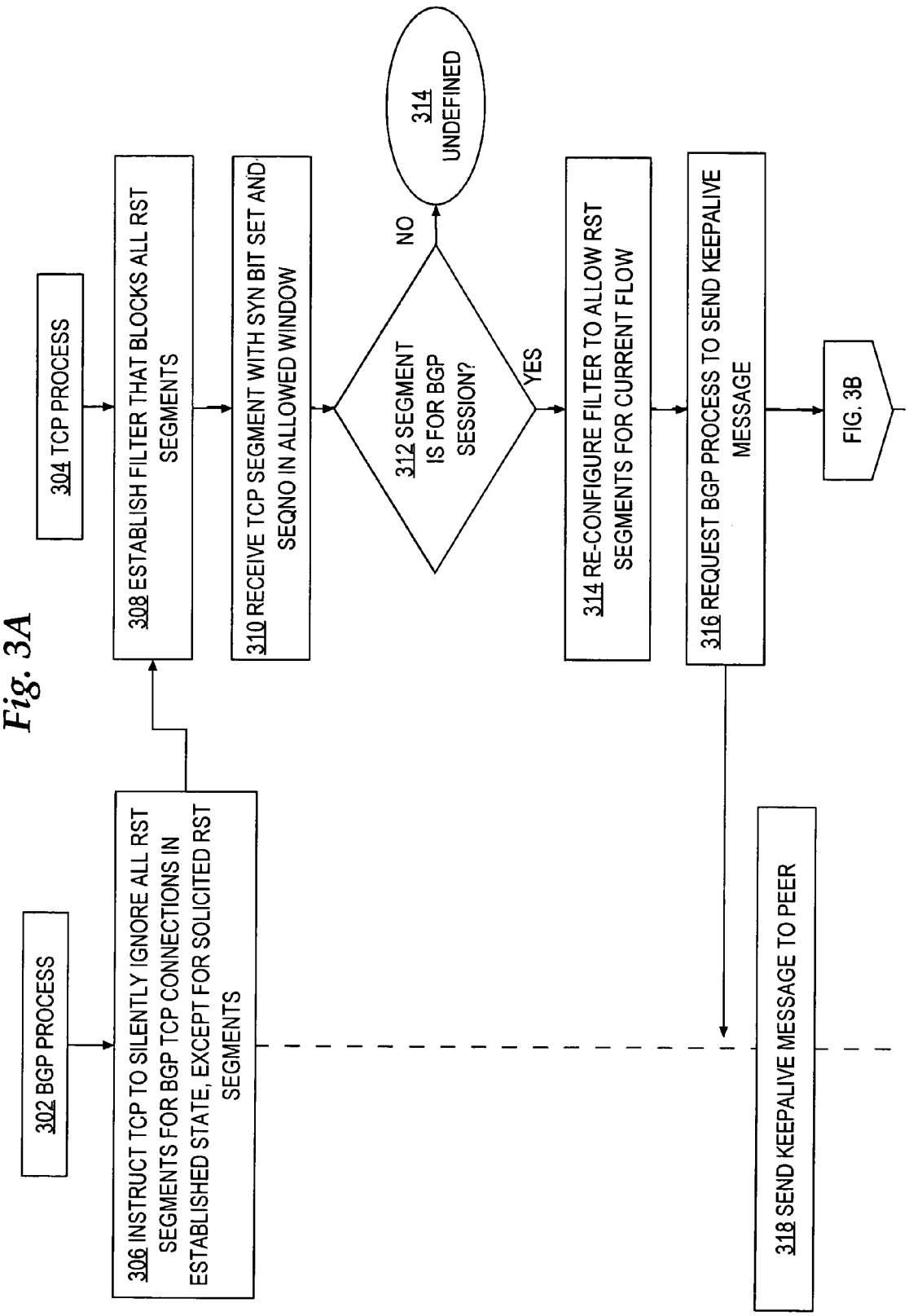
FIG. 3A is a flow diagram that illustrates another embodiment of a method for preventing network reset attacks.
Figure 3B:
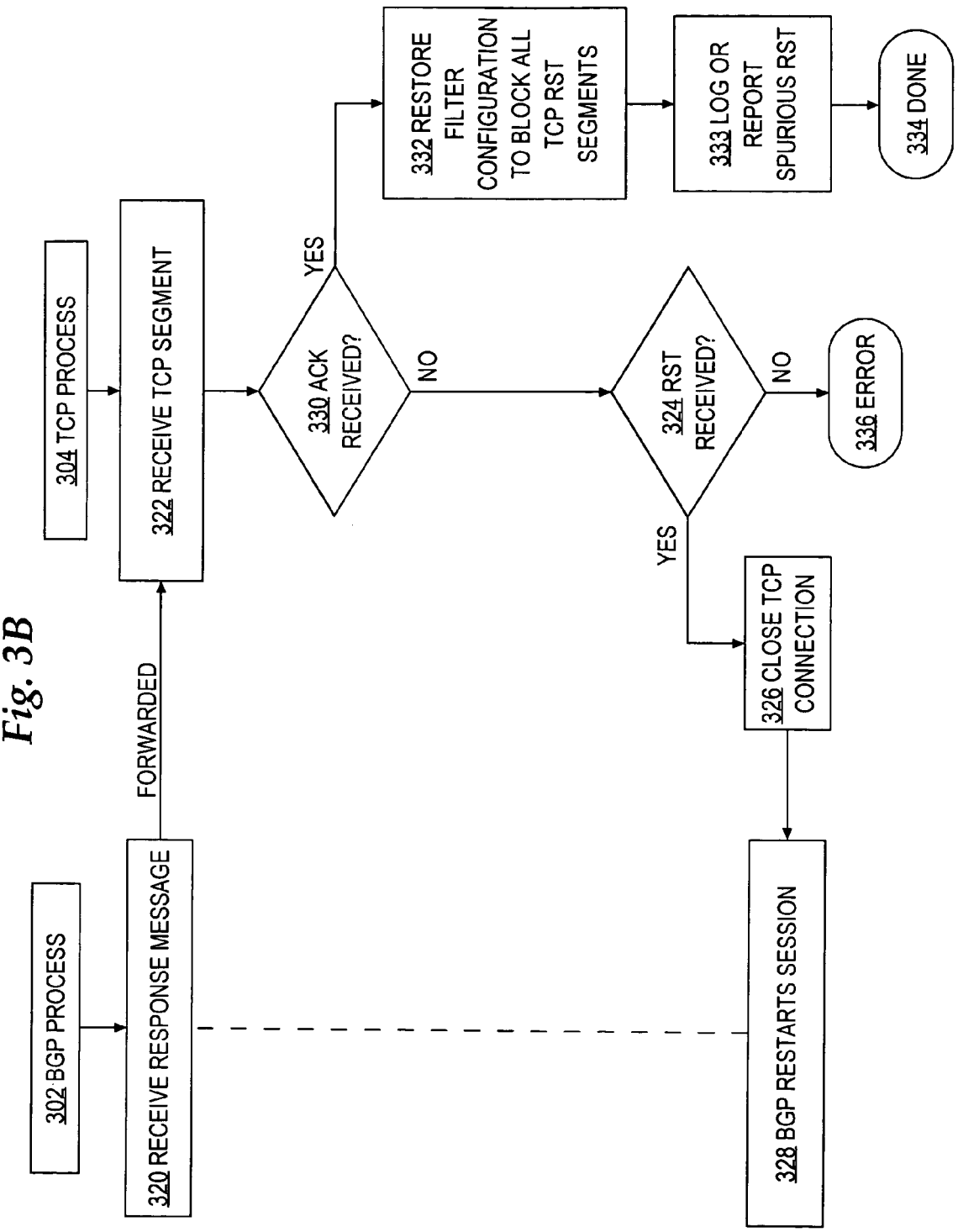
FIG. 3B is a flow diagram showing further steps in the method of FIG. 3A.

FIG. 3A is a flow diagram that illustrates another embodiment of a method for preventing network reset attacks, and FIG. 3B is a flow diagram showing further steps in the method of FIG. 3A. In the process of FIG. 3A, FIG. 3B, the application using the TCP connections is BGP.

Referring first to FIG. 3A, in step 306 a BGP process 302 instructs a TCP process to silently ignore all RST segments for BGP TCP connections that are in the ESTABLISHED state, except for solicited RST segments. As with FIG. 2, an API call to the TCP process can be used to accomplish the request by setting a connection property in a TCB for the subject connections. In step 308, in response, TCP process 304 establishes a filter that blocks all RST segments. Alternatively, no filter is used, and TCP process 304 marks the TCB for the connection with a flag value that indicates to perform TCP RST segment checking.

In step 310, a TCP segment is received with the SYN bit set and a sequence number value within the window of allowed sequence number values for the connection. The received segment could be a spurious segment sent by a malicious party, and not by a peer network element. In step 312, the TCP process 304 tests whether the received segment is for a BGP session. If so, then in step 314 the filter is re-configured to allow entry of RST segments for the current flow or connection and session. Alternatively, if no filter is used, then the flag value in the TCB is re-set so that entry of RST segments is allowed.

Further, in step 316, the TCP process 304 requests the BGP process 302 to send a KEEPALIVE message to its peer. In step 318, the BGP process 302 sends a KEEPALIVE message to its peer BGP process. For example, in the context of FIG. 1, in which TCP applications 106A, 106B are BGP processes, the first TCP application 106A sends a KEEPALIVE message to the second TCP application 106B.

Although this description specifies using a BGP KEEPALIVE message at step 318 as an example, when protocols other than BGP are used, the message sent at step 318 may comprise any valid protocol data unit (PDU) that is valid under the protocol that is in use. Thus, embodiments are not limited to the use of BGP, and are not limited to the use of KEEPALIVE messages with BGP or other protocols.

Referring now to FIG. 3B, in step 322, the TCP process 304 receives a TCP segment for the current connection. In step 330, TCP process 304 determines if the received segment is an ACK segment or a data segment with the ACK bit set. Receiving an ACK segment indicates that the peer TCP process is operating normally, and therefore the segment that was received at step 310 is spurious. Accordingly, in step 332, the filter configuration is restored so that the filter again blocks all inbound TCP RST segments. Alternatively, if no filter is used, the flag value in the TCB is set so that all inbound TCP RST segments are blocked. In either alternative, the TCP connection is not reset and the segment received at step 310 is silently ignored.

If the segment received at step 322 included data, then normal data processing is resumed at step 332 also. In addition, and optionally, at step 333 a log entry or other report, alarm or event may be generated to indicate that a spurious RST segment was received. In this way, a network administrator may be notified so that other defensive action can be taken, if appropriate. Alternatively, spurious RST segments or information about them can be routed to a device or process acting as an RST sink, so that the source of such packets can be characterized over a period of time.

If step 330 determines that no ACK was received as part of the segment received at step 322, then at step 324 the TCP process 304 determines if the received segment has the RST bit set. If so, then the TCP RST segment received at step 310 was legitimate, because receiving another RST segment at step 322 indicates that the peer TCP process actually is resetting. Accordingly, in step 326, the current TCP connection is reset. As a result, BGP process 302 restarts the session with the BGP peer, as shown by step 328.

Steps performed at step 314 and step 336 are undefined and at such steps control may transfer to another process or appropriate error processing may be performed.

FIG. 4 is a flow diagram of yet another embodiment of a method for preventing network reset attacks. The process of FIG. 4 is used to prevent undesired behavior of network elements upon receiving spurious TCP segments with the SYN bit set. For purposes of illustrating an example, FIG. 4 is described herein with reference to the network arrangement of FIG. 1.

In step 402, a request is received from the TCP application not to reset TCP connections upon receiving a TCP segment with the SYN bit set and the sequence number value within the allowed window. For example, TCP process 108A receives an API call from TCP application 106A that invokes a SYN filter function of the TCP process. The SYN filter function may involve setting a connection property in a TCP control block for the current connection that indicates to perform SYN filtering. TCP process 108A responds by establishing an instance of filter 116 that blocks entry of SYN segments.

In step 404, the TCP process receives a TCP segment with a SYN bit set and a particular sequence number value within the allowed window for a TCP connection matching the received TCP segment. The received TCP segment is associated with a session of the TCP application, such as a BGP session. However, the received TCP segment may be a spurious SYN segment and therefore protective checking is performed.

In step 406, the TCP process requests the TCP application to initiate an event that will induce the peer to send a valid response. For example, when the TCP application is BGP, the TCP process may request BGP to send a BGP KEEPALIVE to its BGP peer that is using the TCP connection. However, any other PDU may be used that is valid under the protocol used by the TCP application.

In step 408, the TCP connection is closed only when a TCP RST segment is received in response to the event. Receiving such a RST segment indicates that the original SYN segment was valid and the peer needs to synchronize because it is resetting. Therefore, the TCP connection is closed according to conventional TCP processing. However, if an ACK segment is received at any time after step 404, then the peer process is operating normally, and the SYN segment received at step 404 was spurious. Therefore, the underlying TCP connection is not closed, and the SYN segment received at step 404 is silently ignored.

The solution described herein makes BGP and other TCP applications more resilient to TCP SYN and RST attacks while still providing a mechanism for legitimate peers to close down a BGP session when appropriate. With the approach herein, packets on BGP sessions are easily identifiable as malicious attacks unless they are received in response to a event originated by the protocol stack that receives the RST. Few such instances of solicited RSTs are defined. Therefore, the success rate is expected to be high.

Preferably, but not necessarily, the filters described herein are set up as early in the packet path as possible. For example, in a router having a distributed architecture with separation among a route processor and line cards that interface to network links, the filters and the logic herein may be implemented at the line cards, so that spurious RST segments are trapped before they reach the route processor and burden it with unnecessary processing. In such an arrangement, the filters can be installed close to the entry point of packets on the line cards. When a specific RST segment is solicited from a peer TCP process, the filter is re-configured for receiving a responsive segment. Because the initial connection setup exchange does not happen at packet forwarding speeds, establishing and re-configuring filters as described herein will not significantly impact the performance of a router that implements these techniques.

In any of the foregoing approaches, if the TCP application 106A needs to close a session with peer TCP application 106B, then the first TCP application closes the session only using TCP API functions or calls that generate a TCP FIN-FINWAIT-FIN sequence of states. Thus, the TCP application does not invoke any TCP API function or call that will originate a RST packet to reset BGP sessions.

The techniques herein also provide a mechanism to determine if BGP processes that are part of a BGP session can adhere to the behavior described herein. A BGP process that has the ability to handle SYN and RST packets as described in this document for BGP sessions and the underlying TCP connections exchanges information specifying that it possess the capability described herein. Thus, a capability exchange may be performed within the BGP protocol, or any other protocol that uses a TCP connection, for the purpose of negotiating support for this feature.

In one embodiment, the techniques herein also provide methods to prevent RST attacks for TCP connections associated with BGP sessions by creating an API between TCP and BGP processes and negotiating the features of the API with a peer BGP process. The application processes at the ends of the TCP connection exchange information indicating that they agree to drop all unsolicited RST packets for the TCP connection. In an embodiment, the techniques herein also define a procedure to handle SYN packet attacks on a TCP connection associated with a BGP session by generating a BGP KEEPALIVE as a means to solicit a reply from the other end. The TCP ACK to the BGP KEEPALIVE is used to infer that the connection is in good condition rather than require a new reply message from the BGP process. The techniques herein also effectively replace the unreliable TCP ACK message with a reliable BGP KEEPALIVE message. The latter is reliable because the application message is retransmitted by TCP until it receives an ACK. Any data originated by a TCP application is kept in the TCP retransmission queue and retransmitted until TCP receives an ACK for it.

The techniques described herein offer numerous benefits. For example, the techniques described herein are effective in preventing undesirable consequences in network elements arising from SYN and RST attacks on BGP-TCP connections. Compliance with the approaches herein can be checked using a capability exchange performed among BGP processes. Therefore, the approach herein can be deterministically and incrementally deployed.

Using a BGP KEEPALIVE message to solicit an ACK from the TCP process of a peer network element, as a means of checking the status of the other peer, is a reliable check because the TCP process will re-transmit BGP data until the TCP process receives an ACK.

Since BGP processes always gracefully close a BGP session when a problem is detected, RST filters can be installed for the underlying TCP connections, which cannot be done for all TCP connections on a router. Also, the techniques herein do not impact any BGP restart behavior. If a BGP process fails and restarts and the local TCP process is still active, two approaches may be used. In one approach, TCP connections for BGP are silently dropped, causing a peer network element to re-initiate a connection. In a second approach, the BGP process can initiate the FIN-FINWAIT-FIN sequence of TCP states. Since the peer node is active, the peer node responds to the FIN-FINWAIT-FIN sequence.

The techniques herein also can prevent damage from attacks that are founded on inducing a network element to discard BGP routes. For example, some network analysts believe that the BGP Graceful Restart behavior as defined in present standards creates a vulnerability to attack, in which an attacker can cause a router to repeatedly enter NSF mode and mark routes as stale, by performing a SYN attack. The techniques herein prevent such attacks from proceeding.

3.0 Implementation Mechanisms—Hardware Overview

Figure 5:
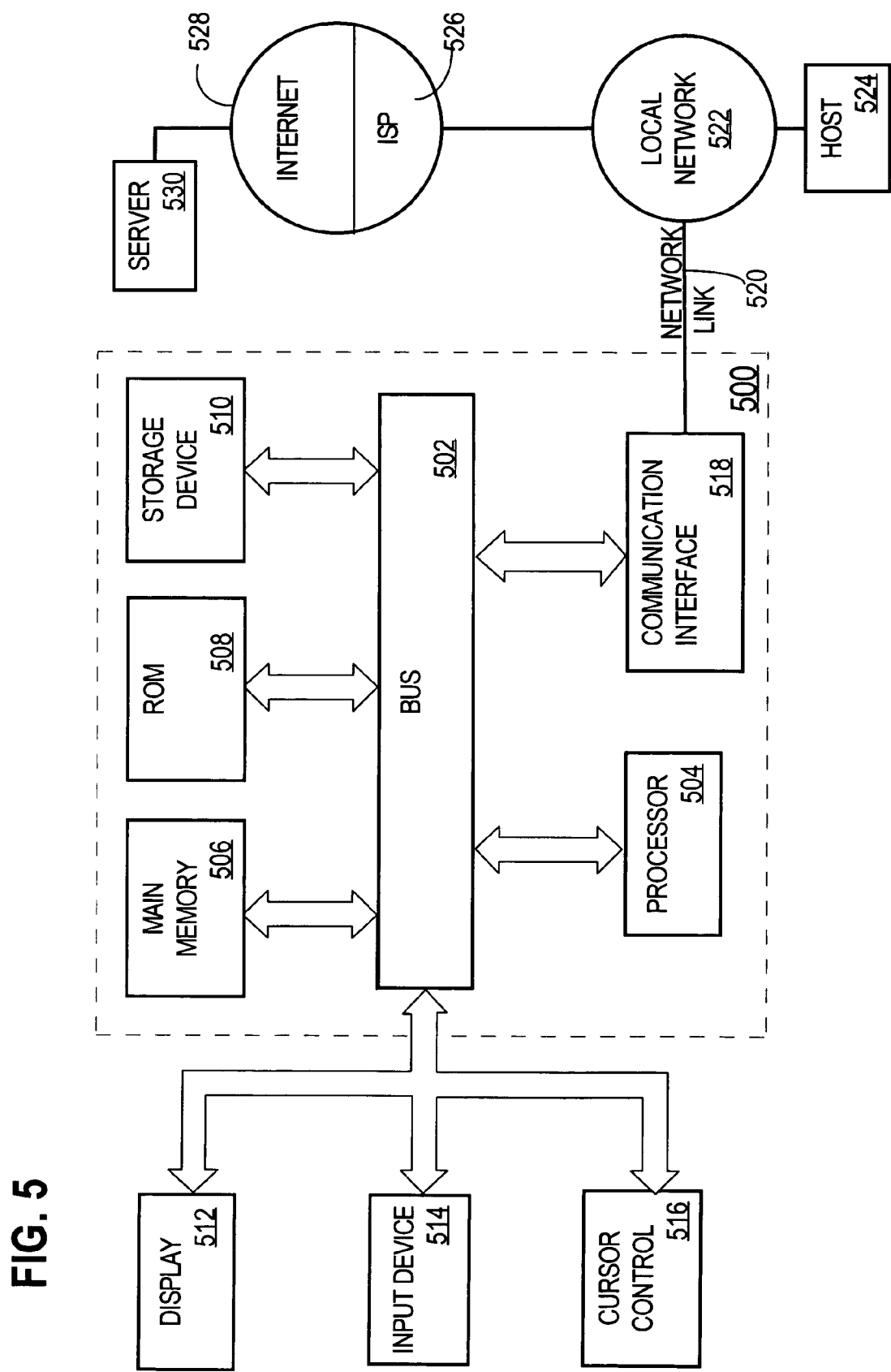
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for preventing network reset attacks. According to one embodiment of the invention, preventing network reset attacks is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for preventing network reset attacks as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method performed by a transmission control protocol (TCP) process in a network element, comprising the computer-implemented steps of:
receiving, at the TCP process, from an application running on top of the TCP process that uses TCP connections, a request to ignore all TCP segments with an RST bit set, except for solicited RST segments;
in response to the request, establishing a TCP filter that blocks all but solicited TCP RST segments;
receiving a TCP segment with a SYN bit set and a sequence number value within an allowed window for a TCP connection matching the received TCP segment, wherein the received TCP segment is associated with a session of the application;
re-configuring the TCP filter to allow TCP RST segments for the TCP connection associated with the received TCP segment;
requesting the application to initiate an event that will solicit a legitimate sender of the received TCP segment to send a valid TCP RST segment in response;
closing the TCP connection associated with the received TCP segment only when a TCP RST segment is received in response to the event;
wherein the steps of receiving, reconfiguring, requesting, and closing are performed by one or more processors.

2. A method as recited in claim 1, further comprising restoring the TCP filter to block all TCP RST segments when a TCP ACK segment is received in response to the event.

3. A method as recited in claim 1, wherein the requesting step comprises requesting the application to send a keep-alive message to a sender of the received TCP segment, and wherein the closing step comprises closing the TCP connection associated with the received TCP segment only when a TCP RST segment is received in response to the keep-alive message.

4. A method as recited in claim 3, further comprising restoring the TCP filter to block all TCP RST segments when a TCP ACK segment is received in response to the keep-alive message.

5. A method as recited in claim 1, further comprising creating and storing a log entry identifying a potentially malicious activity when a TCP ACK segment is received in response to the event.

6. A method as recited in claim 1, further comprising providing information about the received TCP segment to a flow analysis subsystem.

7. A method as recited in claim 1, wherein the application is a Border Gateway Protocol (BGP) process.

8. A method as recited in claim 7, further comprising the BGP process Determining that the TCP connection should be closed, and in response thereto, closing the TCP connection using messages that generate a sequence of TCP states comprising a first FIN state, a FINWAIT state, and a second FIN state.

9. A method as recited in claim 1, wherein the received request specifies TCP connections in an ESTABLISHED state.

10. A method as recited in claim 1, further comprising the steps of:
receiving, from the application, a second request not to reset TCP connections upon receiving a TCP segment with a SYN bit set and the sequence number value within the allowed window;
receiving a second TCP segment with a SYN bit set and a particular sequence number value within the allowed window for a second TCP connection matching the received second TCP segment, wherein the received second TCP segment is associated with a second session of the application;
requesting the application to initiate a second event that will induce legitimate senders of the received TCP segment to send a valid response;
closing the second TCP connection associated with the received second TCP segment only when a TCP RST segment is received in response to the event.

11. A method as recited in claim 10, wherein the requesting step comprises requesting the application to send a keep-alive message to a sender of the received second TCP segment, and wherein the closing step comprises closing the second TCP connection associated with the received second TCP segment only when a TCP RST segment is received in response to the keep-alive message.

12. A method as recited in claim 10, further comprising creating and storing a Second log entry identifying a potentially malicious activity when a TCP ACK segment is received in response to the event.

13. A method as recited in claim 10, further comprising providing information about the received second TCP segment to a flow analysis subsystem.

14. A method as recited in claim 10, wherein the application is a Border Gateway Protocol (BGP) process.

15. A method as recited in claim 10, wherein the received request specifies TCP connections in an ESTABLISHED state.

16. A method as recited in any of claim 1 or claim 10, wherein the application is a Border Gateway Protocol (BGP) process, further comprising the step of the BGP process determining whether a peer process that is participating in the TCP connection is capable of performing the steps of claim 1 or claim 10, respectively.

17. A computer-implemented method performed by a transmission control protocol (TCP) process in a network element, comprising the computer-implemented steps of:
receiving, at the TCP process, from an application running on top of the TCP process that uses TCP connections, a request to ignore all TCP segments with an RST bit set, except for solicited RST segments;
in response to the request, setting a flag value in a TCP connection state data structure, wherein the flag value signals silently dropping all but solicited TOP RST segments;
receiving a TCP segment with a SYN bit set and a sequence number value within an allowed window for a TCP connection matching the received TCP segment, wherein the received TCP segment is associated with a session of the application;
re-setting the flag value to allow TCP RST segments for the TCP connection associated with the received TCP segment;
requesting the application to initiate an event that will solicit a legitimate sender of the received TCP segment to send a valid TCP RST segment in response;
closing the TCP connection associated with the received TCP segment only when a TCP RST segment is received in response to the event;
wherein the steps of receiving, reconfiguring, requesting, and closing are performed by one or more processors.

18. A computer-readable storage medium storing one or more sequences of instructions for preventing network reset attacks, which instructions, when executed by one or more processors that host a transmission control protocol (TCP) process in a network element, cause the one or more processors to perform the steps of:
receiving, at the TCP process, from an application running on top of the TCP process that uses TCP connections, a request to ignore all TCP segments with an RST bit set, except for solicited RST segments;
in response to the request, establishing a TCP filter that blocks all but solicited TCP RST segments;
receiving a TCP segment with a SYN bit set and a sequence number value within an allowed window for a TCP connection matching the received TCP segment, wherein the received TCP segment is associated with a session of the application;
re-configuring the TCP filter to allow TCP RST segments for the TCP connection associated with the received TCP segment;
requesting the application to initiate an event that will solicit a legitimate sender of the received TCP segment to send a valid TCP RST segment in response;
closing the TCP connection associated with the received TCP segment only when a TCP RST segment is received in response to the event.

19. A network element that hosts a transmission control protocol (TCP) process, and further comprising:
means for receiving, at the TCP process, from an application running on top of the TCP process that uses TCP connections, a request to ignore all TCP segments with an RST bit set, except for solicited RST segments;
means for establishing a TCP filter that blocks all but solicited TCP RST segments in response to the request;
means for receiving a TCP segment with a SYN bit set and a sequence number value within an allowed window for a TCP connection matching the received TCP segment, wherein the received TCP segment is associated with a session of the application;
means for re-configuring the TCP filter to allow TCP RST segments for the TCP connection associated with the received TCP segment;
means for requesting the application to initiate an event that will solicit a legitimate sender of the received TCP segment to send a valid TCP RST segment in response;

means for closing the TCP connection associated with the received TCP segment only when a TCP RST segment is received in response to the event.

20. A network element that hosts a transmission control protocol (TCP) process, and further comprising:
one or more processors;
a network interface coupled to a network for communicating one or more packet flows to the network;
a computer-readable medium accessible to the one or more processors and carrying one or more sequences of instructions for preventing network reset attacks, which instructions, when executed by one or more processors that host a transmission control protocol (TCP) process in a network element, cause the one or more processors to perform the steps of:
receiving, at the TCP process, from an application running on top of the TCP process that uses TCP connections, a request to ignore all TCP segments with an RST bit set, except for solicited RST segments;
in response to the request, establishing a TCP filter that blocks all but solicited TCP RST segments;
receiving a TCP segment with a SYN bit set and a sequence number value within an allowed window for a TCP connection matching the received TCP segment, wherein the received TCP segment is associated with a session of the application;
re-configuring the TCP filter to allow TCP RST segments for the TCP connection associated with the received TCP segment;
requesting the application to initiate an event that will solicit a legitimate sender of the received TCP segment to send a valid TCP RST segment in response;
closing the TCP connection associated with the received TCP segment only when a TCP RST segment is received in response to the event.

* * * * *